United States Patent [19]

Antes

[11] Patent Number: 5,106,125
[45] Date of Patent: Apr. 21, 1992

[54] ARRANGEMENT TO IMPROVE FORGERY PROTECTION OF CREDIT DOCUMENTS

[75] Inventor: Gregor Antes, Hirzel, Switzerland

[73] Assignee: Landis & Gyr Betriebs AG, Zug, Switzerland

[21] Appl. No.: 618,105

[22] Filed: Nov. 26, 1990

[30] Foreign Application Priority Data

Dec. 1, 1989 [CH] Switzerland .................. 4310/89

[51] Int. Cl.⁵ ............................................. B42D 15/00
[52] U.S. Cl. ..................................... 283/91; 283/86; 283/94; 283/108; 283/904
[58] Field of Search ................. 283/77, 86, 94, 98, 283/108, 904

[56] References Cited

U.S. PATENT DOCUMENTS

| | | | |
|---|---|---|---|
| 4,250,217 | 2/1981 | Greenaway | 283/904 X |
| 4,573,711 | 3/1986 | Hyde | 283/904 X |
| 4,715,623 | 12/1987 | Roule et al. | |

FOREIGN PATENT DOCUMENTS

| | | |
|---|---|---|
| 0093009 | 2/1983 | European Pat. Off. |
| 0251253 | 7/1988 | European Pat. Off. |
| 0298687 | 11/1989 | European Pat. Off. |
| 2181993A | 5/1987 | United Kingdom |
| 2209995 | 1/1989 | United Kingdom |

*Primary Examiner*—Paul A. Bell
*Attorney, Agent, or Firm*—Marmorek, Guttman & Rubenstein

[57] ABSTRACT

A credit document with improved protection against forgery comprises a film which is attached to a local portion of a surface of the credit document. The film includes at least one security mark. The security mark comprises a micro-relief structure for optically diffracting incident light. A protection profile in the form of a macro-relief structure is also embossed into the surface of the credit document. The security mark and the protection profile overlap in part. The relief lines of the protection profile macrostructure are bent away from the plane of the surface of the credit document sufficiently to provide visible gloss effects due to the reflection of incident light. When this arrangement is utilized one or more visible breaks in the security mark occur when the security mark is removed from the credit document. In addition, the security mark is so deformed by the protection profile, that the deformation is easily visible if the security mark is attached to a second (i.e. a forged) credit document.

12 Claims, 2 Drawing Sheets

ARRANGEMENT TO IMPROVE FORGERY PROTECTION OF CREDIT DOCUMENTS

FIELD OF THE INVENTION

The present invention relates to an arrangement for improving forgery protection of a credit document.

BACKGROUND OF THE INVENTION

Such arrangements can be used to protect banknotes, credit cards and other important credit documents made basically of paper, plastic or some other embossable material.

Credit cards which are protected by an affixed security mark in the form of a hologram with a profile subsequently embossed on either side of the border of the security mark are known. Such an arrangement affords very basic protection against removal of the hologram and subsequent, surreptitious attachment of same on another, forged credit document. The basic profile in such an arrangement is partly embossed into the hologram and partly into the background material of the credit card and comprises a number or a letter.

It is the object of the instant invention to provide an arrangement which improves the protection of credit documents against forgery in such manner that the arrangement can also be used to protect paper money. Preferably manufacturing methods utilized in connection with the arrangement are at least compatible with the printing methods used to produce bank-notes.

SUMMARY OF THE INVENTION

A credit document with improved protection against forgery comprises a film which is attached to a local portion of a surface of the credit document. The film includes at least one security mark. The security mark comprises a micro-relief structure for optically diffracting incident light. A protection profile in the form of a macro-relief structure is also embossed into the surface of the credit document. The security mark and the protection profile overlap in part. The relief lines of the protection profile macro-relief structure are bent away from the plane of the surface of the credit document sufficiently to provide visible gloss effects due to the reflection of incident light. The protection profile protects against removing the security mark and attaching it to a forged document. When this arrangement is utilized one or more visible breaks in the security mark occur when the security mark is removed from the credit document. In addition, the security mark is so deformed by the protection profile, that the deformation is easily visible if the security mark is attached to a second (i.e. a forged) credit document.

DETAILED DESCRIPTION OF PREFERRED EMBODIMENTS

Figure 1:
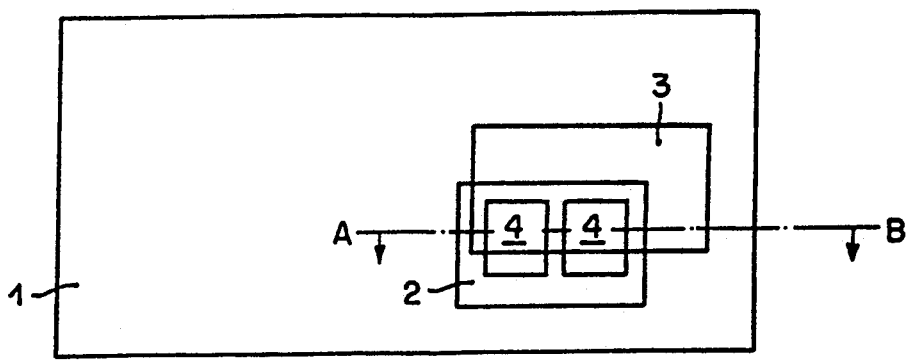
FIG. 1 shows a credit document with two security marks and one protection profile in accordance with the present invention.

Referring to FIG. 1, the arrangement for the improvement of forgery protection of a credit document 1 comprises a film 2 and a protection profile 3, the film 2 being provided with at least one security mark 4. In the representation of FIG. 1, it is assumed that two security marks 4 are used.

The film 2 is affixed on a localized portion of the credit document 1, and contains a reflection layer which is formed either through metallization or through an interface between two dielectric layers having different indices of light refraction. Metallization is in such case on the order of about $5\times10^{-9}$ meter to $100\times10^{-9}$ meters thick. A heat embossable film or an adhesive film is preferably used as the film 2. The heat-embossable film with the security marks 4 is in this case affixed to the credit document 1 by means of a flat embossing stamp. Film 2 is in this case 2 to 3 microns thick and, before application, is supported on a backing that is nearly 20 microns thick. The backing of the heat-embossable film is removed after attachment of the heat-embossable film 2 on the credit document 1, for example by being pulled off.

Each security mark 4 comprises a micro-relief structure that is active through optical diffraction. The microstructure comprises structures with approximately 300 to 3000 lines per millimeter. The microstructures used to form the security marks 4 are preferably holograms, optically diffracting elements known under the tradename KINEGRAM, or simple diffraction gratings. In the European patent applications 89107672.1 and 89107671.3, for example, such microstructures which can be used to advantage in the arrangement according to the instant invention are described.

The protection profile 3 is embossed into the film 2 following the attachment of the film 2 to the credit document 1. The film 2 is provided with at least one security mark 4 in such manner that at least the surface of one of the security marks 4 is provided in part with a portion of the protection profile 3. A cross-section through this overlapping, common portion of the surface of the security mark 4 and of the protection profile 3 along a sectional plane AB (see FIG. 1) is shown for four different embodiments in FIGS. 2 to 5.

The protection profile 3 comprises a number of depressed and/or raised relief lines and a number of flat intervals between the relief lines. The flat intervals extend nearly parallel to the surface of the credit document 1. The protection profile 3 is as a rule a macro-profile, i.e., it contains approximately a maximum of 10 relief lines per millimeter. The depth h (see FIGS. 2 to 5) of the protection profiles is greater than 20 microns and less than 0.5 millimeter.

In each of FIGS. 2 to 5, only four relief lines 5 to 8, 5' to 8', 5" to 8" and 5'" to 8'", respectively, and three intervals 9 to 11, 9' to 11', 9" to 11" and 9'" to 11'", respectively, have been shown for the sake of simplicity.

Figure 2:
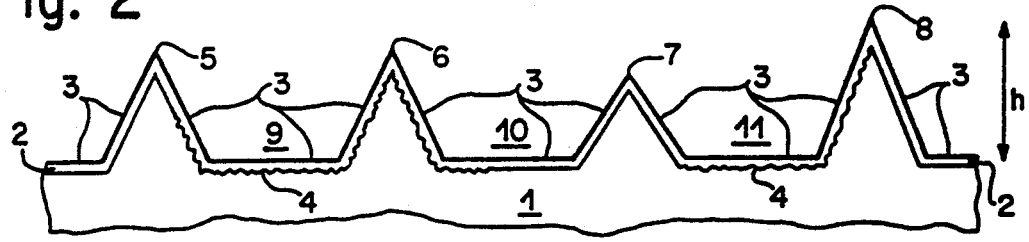
FIG. 2 shows a cross-section through a first embodiment of an overlapping surface of a security mark and a protection profile.
Figure 3:
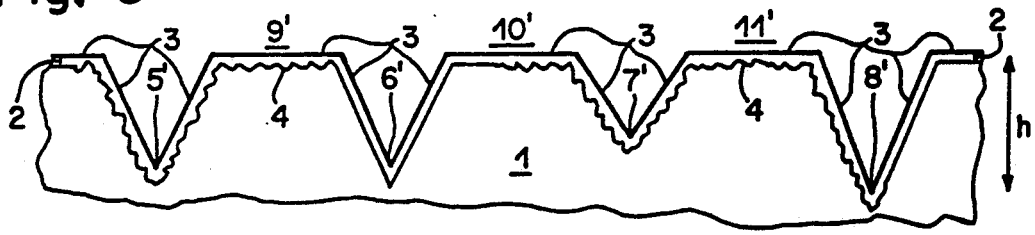
FIG. 3 shows a cross-section through a second embodiment of an overlapping surface of a security mark and a protection profile.
Figure 4:
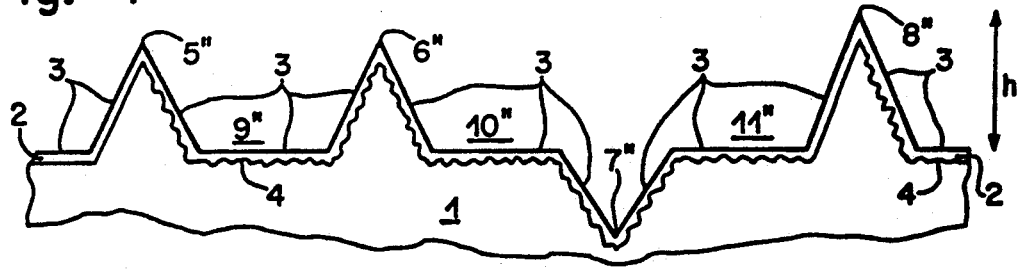
FIG. 4 shows a cross-section through a third embodiment of an overlapping surface of a security mark and a protection profile.
Figure 5:
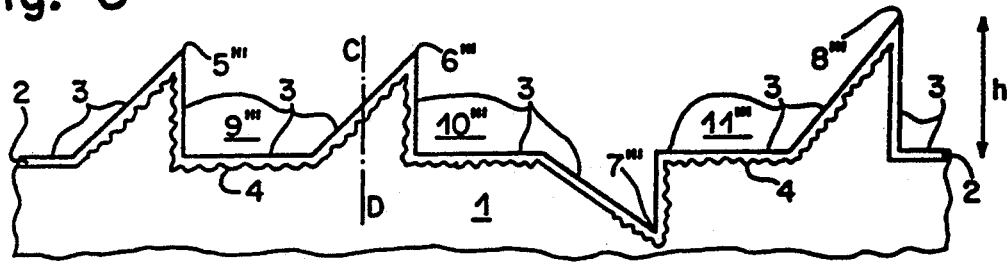
FIG. 5 shows a cross-section through a fourth embodiment of an overlapping surface of a security mark and a protection profile.

The first embodiment shown in FIG. 2 has four raised relief lines 5 to 8, the second embodiment shown in FIG. 3 has four depressed relief lines 5' to 8', and the third and fourth embodiments shown in FIGS. 4 and 5 have three raised relief lines 5", 6" and 8", and 5''', 6''' and 8''', respectively, as well as one depressed relief line 7" and 7'''.

These different embodiment reveal that, basically, any number of raised and depressed relief lines 5 to 8, etc., can be used. At least part of the sides of the relief lines 5 to 8; etc. and of the surfaces of intervals 9 to 11; etc. of the protection profile 3 overlap a part of the corresponding security mark 4.

The raised relief lines 5 to 8 in the representation of FIGS. 2, and the relief lines 5", 6", 8", 5''', 6''' and 8''' in the representations of FIGS. 4 and 5, have the advantage that they improve the wear resistance of the parts of the microstructure of the security elements 4 which overlap or cover the intervals 9 to 11, etc., as the raised relief lines forming the macrorelief structure of the protection profile 3 act as spacers protecting against abrasion the lower flat valleys of the intervals 9 to 11, etc., and the parts of the microstructure which are present there.

The protection profile 3 is produced with the help of a printing process commonly used in the manufacture of banknotes and is preferably produced by non-color-using printing process, or a partially color-using printing process. The utilization of a color-using printing process, which can also be carried out, if desired, without color or with a transparent color, has the advantage that certain special known protective measures needed to produce relief printing in the printing process can be avoided. Furthermore, a color-using protection profile 3 is more difficult to forge than relief printing, because of the color tones used. The printing process is preferably an "intaglio" process, a copper plate process, or a steel plate-engraving process. The relief of the protection profile 3 in the credit document 1 and/or in the film 2 is embossed by means of a profiled stamp for example, simultaneously with or subsequently to the transfer of the security mark 4 to the credit document 1.

Because the intervals 9 to 11; etc. and the portions of the security mark 4 covering them are parallel to the plane of the surface of the credit document 1, the direction of the light rays diffracted by the microstructures of the security mark 4 remains in these portions of the security mark 4 and the protection profile 3 the same as before the credit document 1 is imprinted with the protection profile 3, and therefore the visibility of the microstructure in these portions of the protection profile 3 is not impaired.

The three-dimensional configuration of the relief lines 5 to 8; etc. of the protection profile 3 can be chosen at will. In FIGS. 2 to 5 the presence of protection profiles 3 having a triangular cross-section has been assumed only for reasons of simplification of the drawings. The relief lines 5 to 8; etc. are however sufficiently arched or bent away from the plane of the credit document surface, at least in part, so that gloss effects due to light reflections are predominantly visible on the illuminated protection profile 3. Desired breaks will necessarily be produced in the security mark 4 concerned if such security mark 4 is detached from the credit document 1. Additionally, the portions of the security mark 4 covering the intervals 9 to 11; etc. will be deformed so heavily that the deformation of the security mark 4 can easily be spotted if the detached security mark 4 is attached to a different credit document 1.

In preferably used embodiments of the invention, the protection profile 3 on the credit document 1 is embossed without a seam in such manner that it extends beyond the edge of the film 2, and/or on the film 2 and over and beyond the edge of at least one of the security marks 4 (see FIG. 1). The purpose of this process is to prevent the metal layer 2 supporting the microstructure or the microstructure of the security mark 4 from being cut out of the credit document 1 and from being attached unnoticed on a different credit document 1.

Figure 6:
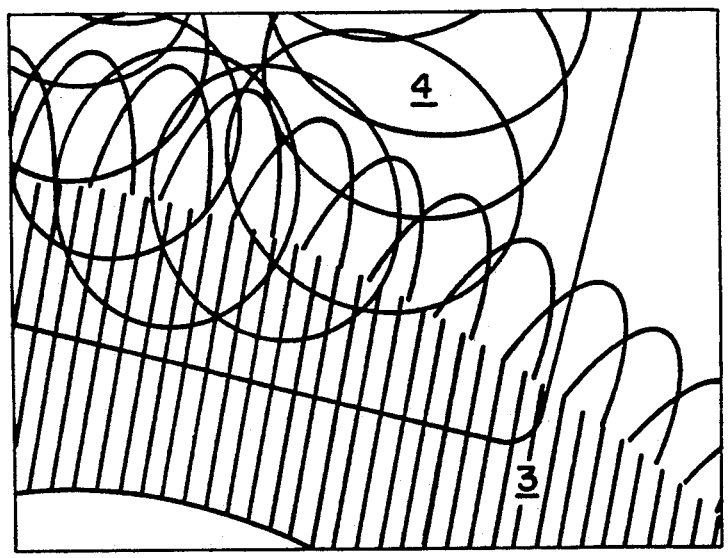
FIG. 6 shows a top view of an overlapping surface of a security mark and a protection profile.

The lines contained in the microstructure of the security mark 4 and the relief lines 5 to 8; etc. of the protection profile 3 are preferably coordinated graphically with each other and arranged in space relative to each other (see FIG. 6) to achieve a certain graphic effect which can be produced only with great precision in positioning so that small deviations can be detected immediately and this too improves protection against an attempted forgery. They are designed so that valley bottoms of the microstructure of the security mark 4 acting through optical diffraction are present directly next to the portions of the protection profile 3 which are active as peaks or produce a moire effect. This too aids in forgery protection.

At least some of the relief lines 5 to 8; etc. of the protection profile 3 are preferably provided with cross-sectional profiles producing special reflection characteristics, whereby the special reflection characteristics are carriers of coded or non-coded optical information. To produce the special reflection characteristics, the relief lines 5 to 8 are preferably asymmetric with respect to a straight line CD which is perpendicular to the surface of the credit document 1, as shown in FIG. 5. The cross-sections shown in FIG. 5 have a saw tooth-shape with the edge of each tooth being asymmetric with respect to the straight line CD.

In the arrangement according to the invention, the optical diffraction effects of the microstructures 4 are interlinked with the reflection effects of the macroprofile structures constituted by the metallic relief arching or bending of the protection profile 3 in such manner that it becomes practically impossible to separate an intact film 2 supporting a microstructure over its entire surface from the credit document 1 and to re-attach it to a different credit document 1 because of the earlier-mentioned desired breaking points and deformation of the security mark 4. Furthermore, it would be extremely difficult to position a protection profile 3 identical to the original macro-profile on the new credit document so as to cover the defective areas exactly.

The arrangement according to the invention additionally has the advantage that it can be easily utilized. The effects can be seen visually or through simple mechanical security verification devices, since the reflection characteristics, e.g., the cylindrical lens effect of the protection profile 3, do not depend on wavelength, while the optical effects of the lightdiffracting microstructures of the security marks 4 depend on wavelength and can thus be distinguished easily from the presence of very specific relief lines of the protection profile 3.

Finally, the above-described embodiments of the invention are intended to be illustrative only. Numerous alternative embodiments may be devised by those skilled in the art without departing from the spirit and scope of the following claims.

I claim:

1. A document with improved forgery protection comprising
   a surface;

a film having at least one security mark formed thereon attached to a localized portion of said surface, said security mark comprising a micro-relief structure for optically diffracting incident light, a protection profile in the form of a macro-relief structure embossed into said surface, a portion of said protection profile overlapping a portion of said security mark, and said protection profile comprising a plurality of relief lines, said relief lines being spaced no closer than 10 relief lines per millimeter, at least a portion of said relief lines being bent away from a plane of said surface sufficiently to reflect incident light so as to provide visible gloss effects.

2. A credit document with improved forgery protection, comprising a surface, a film having at least one security mark formed thereon attached to a localized portion of said surface, said security mark comprising a micro-relief structure for optically diffracting incident light, a protection profile in the form of a macro-relief structure embossed into said surface, a portion of said protection profile overlapping a portion of said security mark, said protection profile comprising a plurality of relief lines separated by intervals, said intervals being substantially parallel to said surface, at least a portion of said intervals overlapping with said security mark, at least a portion of said relief lines being bent away from a plane of said surface sufficiently to provide visible gloss effects due to the reflection of incident light, whereby a visible break in said security mark occurs when said security mark is removed from said surface, and a deformation is visible in said security mark when said removed security mark is attached to a second credit document.

3. The credit document as in claim 2 wherein the protection profile is embossed on the credit document so as to extend at least beyond an edge of the film.

4. The credit document of claim 2 wherein the protection profile is embossed on the film beyond the edge of said at least one security mark.

5. The credit document as in claim 2 wherein the protection profile has depressed relief lines.

6. The credit document as in claim 2 wherein the protection profile has raised relief lines.

7. The credit document of claim 2 wherein the macrostructure of the protection profile and the microstructure of the security mark include patterns, the patterns being coordinated graphically with each other so that small deviations in the placement of the protection profile and security mark relative to one another can immediately be spotted in an attempted forgery.

8. The credit document of claim 2 wherein the microstructure of the security mark comprises valley bottoms, the protection profile and the security mark being arranged so that a portion of the valley bottoms of the microstructure of the security mark becoming active through optical diffraction are located directly next to portions of the protection profile becoming active as peaks.

9. The credit document of claim 2 wherein the protection profile is a colorless printed profile.

10. The credit document of claim 2 wherein the protection profile is at least in part a colored printed profile.

11. The credit document of claim 2 wherein at least part of the relief lines of the protection profile include crosssections with optical reflection characteristics for carrying optical information.

12. The credit document of claim 11 wherein the relief lines are asymmetric in relation to a straight line extending at a perpendicular to the surface of the credit document.

* * * * *